United States Patent [19]

Panossian

[11] Patent Number: 5,249,381
[45] Date of Patent: Oct. 5, 1993

[54] VEHICLE EMERGENCY SIGN

[76] Inventor: Raffy Panossian, P.O. Box 2054, Cambridge, Ontario, Canada, N3C 2V6

[21] Appl. No.: 885,444

[22] Filed: May 20, 1992

[51] Int. Cl.⁵ .......................................... G09F 21/04
[52] U.S. Cl. ...................................... 40/591; 40/491; 116/28 R
[58] Field of Search ............... 40/488, 491, 586, 610, 40/592, 593, 582; 116/28 R, 173, 175; 312/205; 403/108, 109

[56] References Cited

U.S. PATENT DOCUMENTS

| | | | |
|---|---|---|---|
| 465,513 | 12/1891 | Applegate | 40/582 |
| 918,579 | 4/1909 | Murch | 403/109 X |
| 1,120,955 | 12/1914 | Martin | 312/205 X |
| 3,060,605 | 10/1962 | Flack | 40/591 |
| 3,670,438 | 6/1972 | Carroll et al. | 40/591 X |
| 3,791,336 | 2/1974 | Zdebski | 40/591 X |
| 3,813,730 | 6/1974 | Smith | 160/118 X |
| 4,178,874 | 12/1979 | Berns et al. | 116/28 R |
| 5,140,933 | 8/1992 | Nishima et al. | 40/591 X |

Primary Examiner—James R. Brittain
Assistant Examiner—Brian K. Green
Attorney, Agent, or Firm—Robert G. Hendry; Robert A. Wilkes

[57] ABSTRACT

An extendable sign of suitable resilient plastic designed to hang on a vehicle window and be visible to passing traffic. The sign is composed of multiple panels interconnected by sliding means which allow the sign to be retracted for convenient storage and extended to display a preprinted message. A bracket attached to a first panel has a hook portion for engaging the upper edge of a vehicle side window, and a support portion to aid in maintaining the sign in an extended position from the side of the vehicle.

5 Claims, 3 Drawing Sheets

VEHICLE EMERGENCY SIGN

BACKGROUND OF THE INVENTION

This invention relates to a portable sign for use in motor vehicles, particularly as an emergency distress sign which can be mounted easily and securely on the vehicle window.

Such vehicle signs are known but generally these prove cumbersome to store and to install due to a large number of parts both in the mounting system and in display pieces. Other signs of this nature in an attempt to be more convenient and storable have compromised greatly on size and hence on visibility and usefulness.

It is, therefore, an object of the present invention to provide a portable sign for use on motor vehicles which is readily legible to passing motorists.

A further object of the invention is to provide a sign which is compact and easily stored in a glove compartment or equally small storage space.

A further object of the invention is to provide a sign which is easy to mount securely on a side window without the necessity of leaving the vehicle.

Still another object of the invention is to provide a sign of simple construction which is inexpensive to manufacture.

SUMMARY OF THE INVENTION

Accordingly the present, invention provides an extendable sign for mounting on the side of a motor vehicle. The sign has a plurality of extendably interconnected panels of substantially rigid material and a bracket secured to a first panel for mounting the sign to project from the side of the vehicle.

DESCRIPTION OF THE DRAWINGS

The above and other objects and advantages of the present invention will be better understood and further described in the following detailed description in conjunction with the accompanying drawings in which.

DESCRIPTION OF THE PREFERRED EMBODIMENTS

Figure 1:
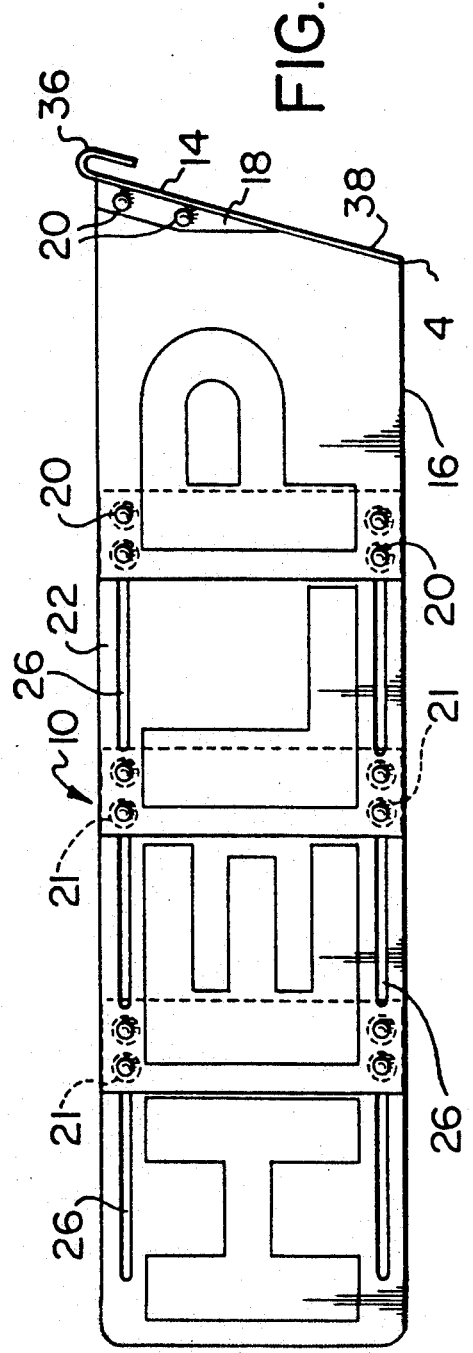
FIG. 1 is a front view of a sign in accordance with the present invention.
Figure 2:
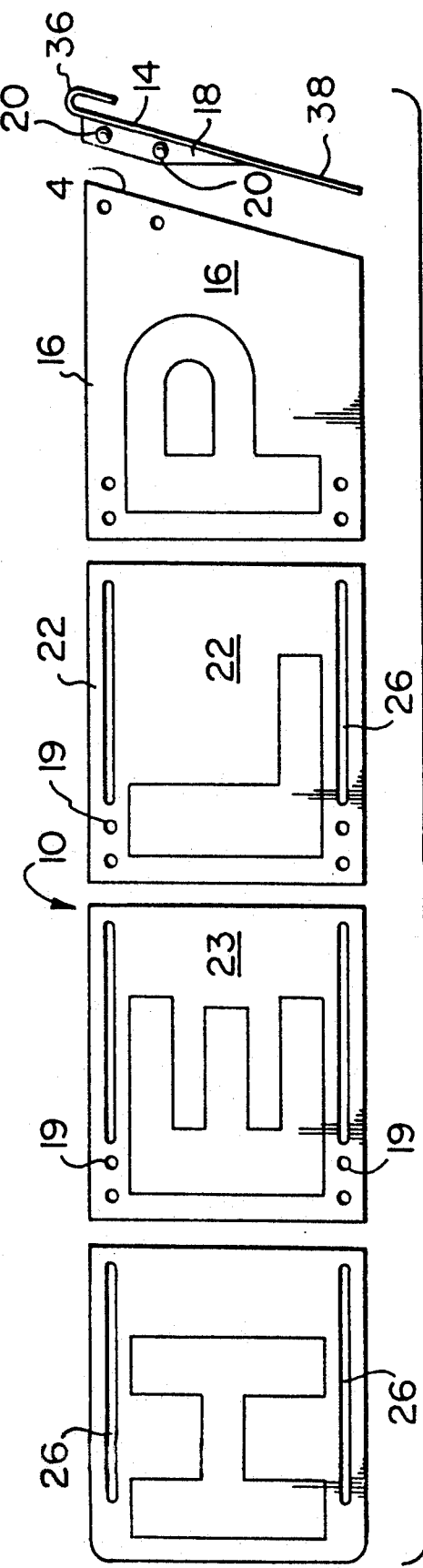
FIG. 2 is an exploded view of the sign showing all the components before assembly.
Figure 3:
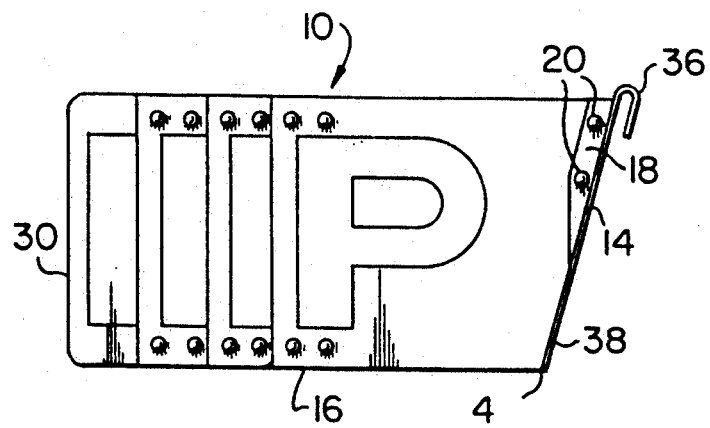
FIG. 3 is a front view of the sign retracted for storage.

Referring now more specifically to the details of the invention, the sign 10 comprises in combination a mounting bracket 14, which secures a first panel 16 between the pair of flanges 18 on the bracket 14 at right angles to the bracket portion. A leading edge 4 of the first panel 16 forms an angle such that when joined to the bracket 14 the slope coordinates with that of the vehicle side window allowing the sign to be supported in a relatively horizontal position in use and be easily visible to passing motorists.

The first panel is attached to a number of intermediate panels 22 and 23 (in this case two) by attachment means 20 of metal or plastic material, in the present embodiment the panels 16, 22, 23 and 30 are attached with metal rivets 20 carrying plastic washers 21. The intermediate panels 22 and 23 are substantially identical having apertures 19 to receive the attachment means and cut with horizontally extending parallel slots 26. The attachment means extend through the apertures 19 of one panel 22 and through the slots 26 of the next panel 23 and in conventional peg and slot configuration permitting each panel to slide the length of the slots thereby extending or retracting the sign 10.

The last panel 30 has slots 26 identical to those on the intermediate panels 22 and 23 however panel 30 does not have apertures 19 to receive rivets.

Figure 4:
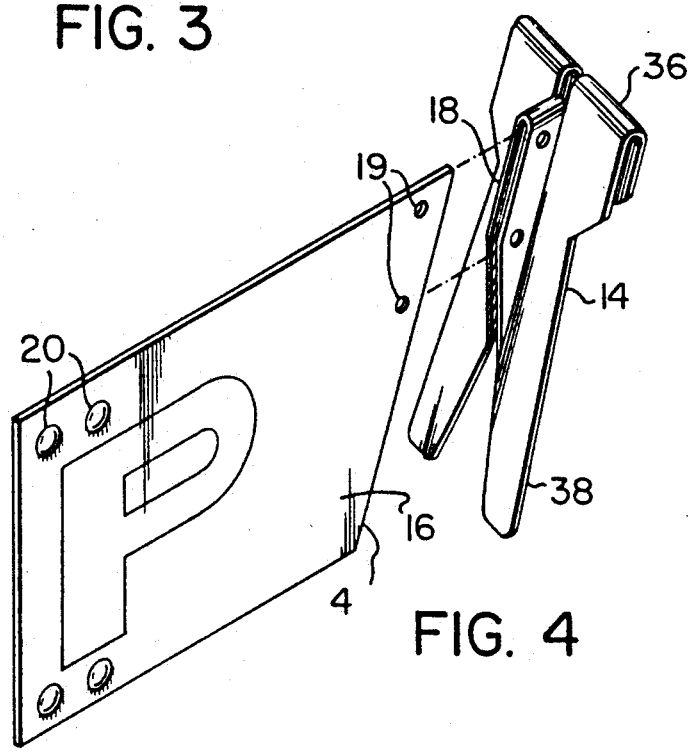
FIG. 4 is a perspective view showing only the mounting bracket in detail.
Figure 5:
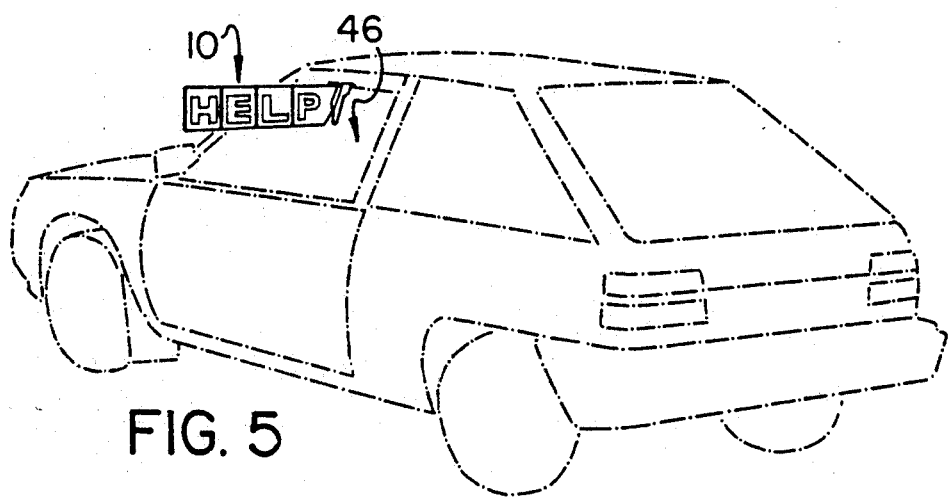
FIG. 5 is a diagrammatic view of the sign in use.

The bracket 14 has an upper hook portion 36 formed to receive the top edge of a vehicle side window 46. When the sign 10 is installed the window 46 can be returned to a closed position tightly securing the sign 10 between the window and frame without causing damage to the vehicle. Bracket 14 has a lower support portion. The bracket is comprised of two cooperating parts—which are reverse images of each other. In an alternate embodiment as shown in FIG. 4 the bracket is moulded as a single piece of suitable plastic material such as styrene, the two portions being connected at the top of the flanges 18 forming a channel to receive the first panel 16.

The bracket 14 and sign panels 16, 22, 23 and 30 are made of a durable all-weather plastic such as styrene that will resist breaking in rain, snow or wind. A visible indicia as a message or emblem can be silkscreened or applied to both sides of the sign 10 in high visibility, high contrast or reflective lettering.

Figure 6:
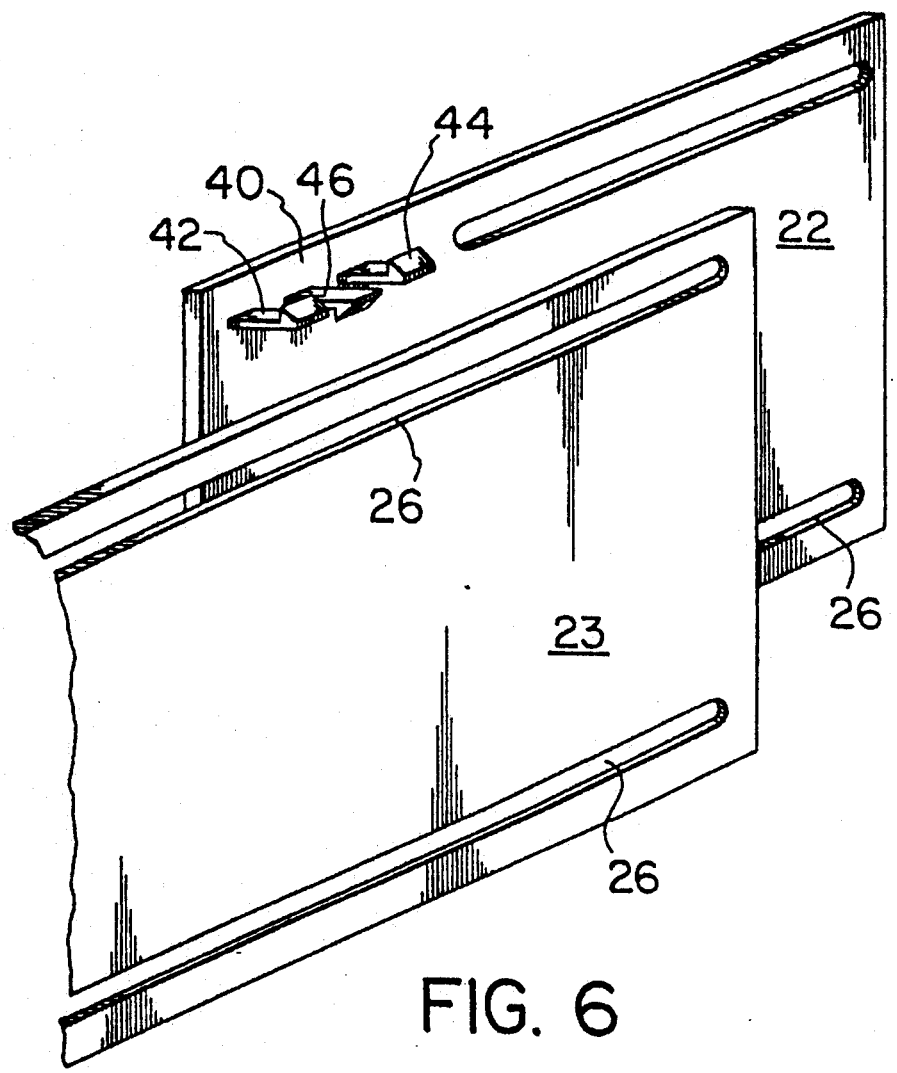
FIG. 6 is a perspective view of a portion of the sign showing an alternative embodiment of the attachment means.

Alternatively as shown in FIG. 6 panels 16, 22 and 23 are provided with integral moulded fastening means 40 in place of apertures 19 described above for receiving rivet type fastening means 20.

The fastening means 40 includes two barbed projections 42 and 44 disposed perpendicularly to the panel 22 so as to cooperate with the slot 26 of the associated panel 23. A third barbed projection 48 is disposed between the projections 42 and 44 and is inverted so as to engage the other side of slot 26.

In use the sign 10 hooks on any vertically moveable vehicle side window 46 and is supported in a substantially horizontal position projecting from the side of the vehicle. The sign 10 can be installed from inside the car when the window 46 is partially open. When fully extended in this position the sign 10 is easily visible to passing motorists. The sign 10 retracts to a size convenient for storage in a glove compartment or similar small area.

The embodiments of the invention in which an exclusive property or privilege is claimed are defined as follows:

1. An extendable sign for mounting on a vertically movable side window of a motor vehicle comprising in combination at least:
   a plurality of interconnected panels of substantially rigid material slidably extendable linearly from a first closed position to a second extended position;
   attachment means interconnecting in the panels for allowing the panels to slide relative to one another, the attachment means comprising one or more barbed projections on one panel with a slot in an associated panel; and
   a bracket means secured to a first panel for mounting the sign on a vertically moveable side window of a motor vehicle to project when extended substantially horizontally from a side of the vehicle.

2. An extendable sign as claimed in claim 1 wherein the bracket means includes a hook means for engaging an upper edge of a vertically moveable vehicle side window, a support means for bearing against an exterior surface of the vehicle side window, and an attachment means for securing the bracket means to an end of the sign.

3. An extendable sign as claimed in claim 1 wherein visible indicia are applied to the panels.

4. An extendable sign as claimed in claim 3 wherein the visible indicia are applied as reflective printing.

5. An extendable sign for displaying from a side window of a motor vehicle comprising in combination:

a bracket including a hook means and a support means;

a first panel including a leading edge and a trailing edge, wherein the leading edge is secured at right angles to the support means;

a first and a second intermediate panel, each including a leading edge, a trailing edge, and parallel slots extending from adjacent the leading edge to adjacent the trailing edge; an end panel including a leading edge, a trailing edge and parallel slots extending from adjacent the leading edge to adjacent the trailing edge; and attachment means comprising barbed projections on the first panel and on the intermediate panels extending into the slots in each associated panel for slideably interconnecting the panels.

* * * * *